United States Patent [19]

Casey

[11] Patent Number: 4,839,728
[45] Date of Patent: Jun. 13, 1989

[54] PICTURE-IN-PICTURE VIDEO SIGNAL GENERATOR

[75] Inventor: Robert F. Casey, Briarcliff Manor, N.Y.

[73] Assignee: RCA Licensing Corporation, Princeton, N.J.

[21] Appl. No.: 29,036

[22] Filed: Mar. 23, 1987

[51] Int. Cl.[4] .................... H04N 5/262; H04N 5/272
[52] U.S. Cl. ..................................... 358/183; 358/22
[58] Field of Search ......................... 358/183, 22, 181

[56] References Cited

U.S. PATENT DOCUMENTS

| 4,249,213 | 2/1981 | Imaide et al. | 358/183 |
| 4,267,560 | 5/1981 | Ishikawa et al. | 358/22 |
| 4,623,915 | 11/1986 | Bolger | 358/183 |
| 4,656,516 | 4/1987 | Fling | 358/183 |
| 4,724,487 | 2/1988 | Casey | 358/183 |

OTHER PUBLICATIONS

"LM1881 Video Sync Separator"; National Semiconductor; Apr. 1986.

Primary Examiner—Tommy P. Chin
Attorney, Agent, or Firm—Eugene M. Whitacre; Paul J. Rasmussen; Eric P. Herrmann

[57] ABSTRACT

A picture-in-picture video signal generator includes a source of an auxiliary video signal, and a producer of successive samples representing the auxiliary video signals. A self-sequencing memory includes a data input terminal coupled to the producer of auxiliary video samples; a write address input terminal, for receiving an initial write address; a data output terminal and a read address input terminal for receiving an initial read address. Write control circuitry is coupled to the write address terminal of the self-sequencing memory, and generates initial write addresses in synchronism with horizontal line intervals of the auxiliary video signal. A source of a main video signal is also provided. Read control circuitry is coupled to the read address terminal of the self-sequencing memory, and generates initial read addresses in synchronism with horizontal line intervals of the main video signal. The main video signal is combined with samples from the self-sequencing memory to form a video signal representing a picture-in-picture image.

15 Claims, 3 Drawing Sheets

PICTURE-IN-PICTURE VIDEO SIGNAL GENERATOR

The present invention relates to a video signal generator for generating a signal representing both a main picture and an auxiliary picture simultaneously.

BACKGROUND OF THE INVENTION

Known picture-in-picture television receivers include two video signal channels, a main and an auxiliary channel, each including a tuner; an IF chain; and a video detector. The information from the auxiliary channel is compressed and stored in a memory in synchronism with the auxiliary video signal. This stored information is retrieved in synchronism with the main video signal and replaces a portion of the main video signal at a predetermined image location. In this way, a picture-in-picture video signal is formed representing an image having a first region which displays the main video image, as represented by the main video signal, and a second, usually smaller, region which displays the auxiliary video image, as represented by the auxiliary video signal.

An NTSC standard video signal consists of successive frames of 525 lines made up of two interlaced fields of 262½ lines each. A sampled-data processed NTSC signal sampled at a rate of four times the color subcarrier frequency contains 910 samples in each line. The auxiliary video signal is compressed by, for example, sampling it at the above rate, and storing in the memory only every third sample of every third line. Each field of compressed auxiliary image information, thus, comprises 87 lines of 303 samples each.

In each NTSC video field, 21 lines form a vertical blanking interval (VBI) and do not contain image information. Thus, in general, seven lines (⅓ of 21) of the compressed auxiliary video signal contain VBI signal information and need not be displayed in the inserted auxiliary image. Only the 80 remaining lines contain image information. In addition, in each line, approximately 150 samples form a horizontal blanking interval (HBI) and do not contain image information. Thus, in general, 50 samples (⅓ of 150) of compressed auxiliary video signal contain HBI signal information and need not be displayed in the inserted auxiliary image. Only the 253 remaining samples contain image information.

In each field of a sampled data main video signal, a portion, consisting of 253 adjoining samples of 80 adjoining lines, is replaced by the previously stored non-VBI and HBI compressed auxiliary samples. If this portion is located in the lower right hand corner, for example, samples 607 through 859 (totaling 253 samples) of lines 182 through 261 (totaling 80 lines) of the main video signal may be replaced with the previously stored compressed auxiliary video samples to form the picture-in-picture video signal. Alternatively, the previously stored 80 lines of 253 samples each, which represent the auxiliary image, may be retrieved from the memory, converted into a continuous signal and substituted into a corresponding portion of a main video signal, which is also in continuous form.

The memory may be envisioned as being subdivided into three blocks, each capable of storing one field of compressed auxiliary video information. Successive fields of compressed auxiliary video information are written into these blocks in round robin fashion. Fields of previously stored compressed auxiliary video information are retrieved from the blocks, also in round robin fashion, so that no block is written into and read from simultaneously.

Dual port memories have recently become available which have a high memory capacity (for example, they are capable of storing a full field of video information), and are priced such that integration into a consumer television receiver is feasible. For example, the HM 53051P, 262,144-word 4-bit frame memory, manufactured by Hitachi, is such a dual port video memory system. Such a high capacity memory chip allows flexibility in use which was previously unavailable with lower capacity memory integrated circuits.

The HM 53031P includes a data input terminal and a write address terminal. Standard random access memories (RAM's) require each sample to be stored to be accompanied by an address signal. Unlike the standard RAMs, an address signal need not be supplied concurrently with each sample to be stored for the HM 53031P. Instead, the write address terminal receives an initial write address. Subsequent successive samples are sequentially stored in storage locations beginning at the location corresponding to the last received initial write address. The HM 53031P further includes a data output terminal and a read address terminal. The read address terminal receives an initial read address. Samples are retrieved from sequential locations in the memory beginning at the location corresponding to the last received initial read address. In the remainder of this specification, such a memory will be referred to as a self-sequencing memory. It is desirable to incorporate such a memory in a picture-in-picture video signal generator.

SUMMARY OF THE INVENTION

In accordance with principles of the present invention, a picture-in-picture video signal generator includes a source of successive samples representing an auxiliary video signal. A self-sequencing memory includes a data input terminal coupled to the source of auxiliary video samples; a write address input terminal for receiving an initial write address; a data output terminal and a read address input terminal for receiving an initial read address. Write control circuitry is coupled to the write address terminal of the self-sequencing memory, and generates initial write addresses in synchronism with horizontal line intervals of the auxiliary video signal. A source of a main video signal is also provided. Read control circuitry is coupled to the read address terminal of the self-sequencing memory, and generates initial read addresses in synchronism with horizontal line intervals of the main video signal. Means are provided for combining the main video signal with a signal representing samples retrieved from the self-sequencing memory to form a signal representing a picture-in-picture image.

DETAILED DESCRIPTION

For simplicity, in all of the FIGURES, equalizing delays, which may be required in various paths between processing blocks, have been omitted. A person skilled in the art of circuit design would understand where these delays are required and how to implement them properly. In addition, the system illustrated in the FIGURES will produce a black-and-white picture-in-picture video signal. Three such systems may be combined to form a color picture-in-picture video signal. The three may operate on a luminance and two color difference signals, or on red, green and blue color signals. In the detailed description below, both the main and auxiliary video signals are assumed to be sampled data signals. It should be understood that the main video signal could be a continuous signal, and still operate properly.

Figure 1:
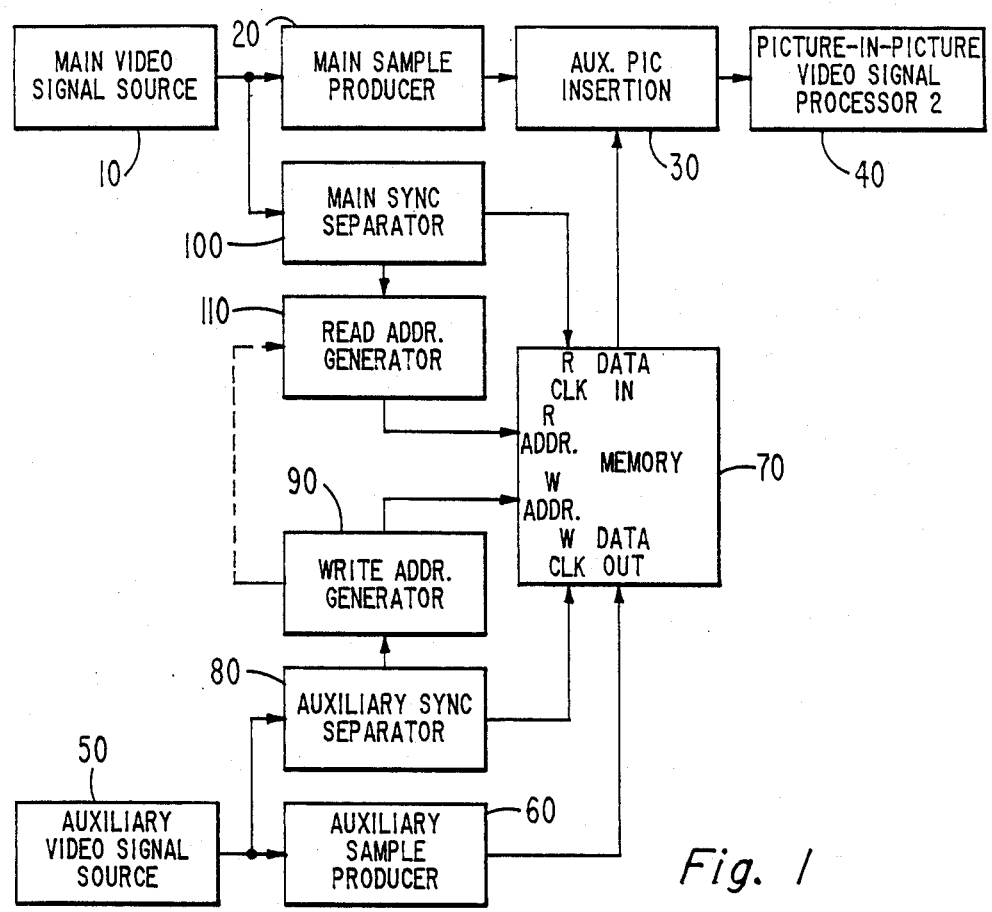
FIG. 1 is a block diagram of an exemplary embodiment of a picture-in-picture image signal generator according to the present invention.

In FIG. 1, a source 10 of a main video signal may, for example include an antenna, tuner, IF chain, video detector and luminance/chrominance separator, as found in a standard color television receiver. An output terminal of the main video signal source 10 is coupled to an input terminal of a main sample producer 20. An output terminal of main sample producer 20 is coupled to an input terminal of an auxiliary picture insertion circuit 30. An output terminal of auxiliary picture insertion circuit 30 is coupled to a picture-in-picture video signal processor 40 which may include video amplifiers, a picture tube, and deflection circuitry as found in a standard color television receiver.

An auxiliary video signal source 50 may include, for example, a second tuner, IF chain, video detector and luminance/chrominance separator, similar to those which may be found in the main video signal source 10. An output terminal of the auxiliary video signal source 50 is coupled to an input terminal of an auxiliary sample producer 60. An output terminal of auxiliary sample producer 60 is coupled to a data input terminal of a self-sequencing memory 70. A data output terminal of self-sequencing memory 70 is coupled to a second input terminal of the auxiliary picture insertion circuit 30.

The output terminal of the auxiliary video signal source 50 is also coupled to an input terminal of an auxiliary synchronization component separator 80. A first output terminal of auxiliary synchronization separator 80 is coupled to a write clock input terminal (W CLK) of memory 70. A second output terminal of the auxiliary synchronization component separator 80 is coupled to an input terminal of a write address generator 90. An output terminal of the write address generator 90 is coupled to a write address input terminal (W ADR) of memory 70. The combination of auxiliary synchronization component separator 80 and write address generator 90 form circuitry which controls the writing of auxiliary video signal samples into self-sequencing memory 70.

The output terminal of main video signal source 10 is also coupled to an input terminal of a main synchronization component separator 100. A first output terminal of main synchronization component separator 100 is coupled to a read clock input terminal (R CLK) of memory 70. A second output terminal of main synchronization component separator 100 is coupled to an input terminal of a read address generator 110. An output terminal of read address generator 110 is coupled to a read address input terminal (R ADR) of memory 70. The combination of main synchronization component separator 100 and read address generator 110 form circuitry which controls the reading of previously stored samples from self-sequencing memory 70.

In operation, auxiliary sample producer 60 produces successive samples representing an auxiliary image. Samples from the auxiliary sample producer 60 are stored in self-sequencing memory 70 in synchronism with the auxiliary video signal. This synchronism is maintained by the clock signal supplied from the first output terminal of the auxiliary synchronization component separator 80 to the write clock input terminal (W CLK) of memory 70. A sample at the data input terminal of memory 70 is written into a memory location when a clock signal is supplied to the write clock input terminal (W CLK).

Samples from only every third line of the auxiliary video signal are stored in self-sequencing memory 70 as part of the compressed auxiliary video signal. In order to store the samples of the compressed auxiliary video signal in the correct location in memory, a write address must be supplied to memory 70 for each line of compressed auxiliary video signal to be stored. This address corresponds to the location into which the first sample of that line is to be stored. Before the beginning of the selected lines of the auxiliary video signal, write address generator 90 supplies that address to the write address terminal (W ADR) of memory 70. Samples of the selected line of the auxiliary video signal field are stored in sequential memory locations beginning at that write initial location.

Samples from self-sequencing memory 70, representing the compressed auxiliary video signal image, are substituted for appropriate main video signal samples in the auxiliary picture insertion circuitry 30. The reading of these previously stored samples from memory 70 is in synchronism with the main video signal source. This synchronism is maintained by the clock signal supplied from the first output terminal of the main synchronization component separator 100 to the read clock input terminal (R CLK) of memory 70. A sample is read from memory 70 and is presented to the data output terminal when a clock signal is supplied to the read clock input terminal (R CLK).

In the example described above, samples 607 through 859 (totaling 253 samples) of lines 182 through 261 (totaling 80 lines) of the main video signal are replaced with previously stored compressed auxiliary video samples retrieved from memory 70. A counter in the main synchronization component separator 100 counts lines of the main video signal and generates a signal when lines 182 through 261 are being scanned. Another counter counts samples within lines of the main video signal and generates a signal when samples 607 through 859 are being scanned. The concurrence of these two signals indicate that auxiliary video signal samples are to be retrieved from memory 70. Read clock signals are supplied to memory 70 during the period of concurrence.

In order to retrieve samples representing the correct line from memory 70, a read address must be supplied to memory 70 corresponding to the location of the first sample of that line. Before the 607th sample of each of lines 182 through 261 of the main video signal, read address generator 110 supplies an address to the read address terminal (R ADR) of memory 70. This address corresponds to the predetermined read initial location in the memory 70 for the current line. Samples of the previously stored auxiliary video signal are retrieved from sequential memory locations beginning at this read initial location.

Figure 2:
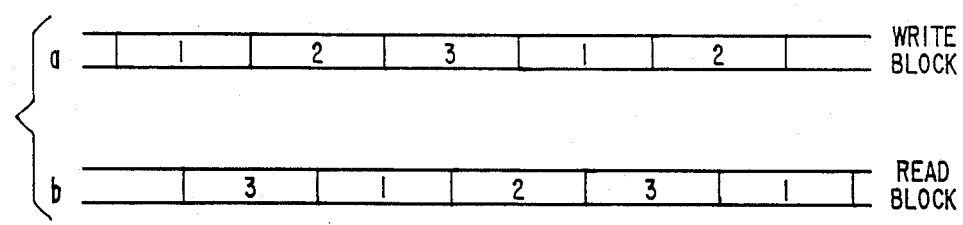
FIG. 2 is a timing diagram useful in understanding the operation of the picture-in-picture video signal generator illustrated in FIG. 1.

As described above, self-sequencing memory 70 (of FIG. 1) may be envisioned as being subdivided into three blocks designated 1, 2 and 3. Successive fields of auxiliary video samples are written into successive blocks of the memory 70 in round robin fashion. In FIG. 2, waveform (a) is divided into blocks representing auxiliary video signal field time intervals. The number within each division indicates the block number into which compressed data representing that auxiliary video field is being written. For example, the field scanned during the leftmost field time period is written into block 1; the next field is written into block 2; the next into block 3; and so forth. Waveform (b) is divided into blocks representing main video signal field time intervals. The number within each division represents the block from which data is read and inserted into the main video signal to form the picture-in-picture video signal. For example, the left-most field is read from block 3; the next field from block 1; the next from block 2; and so forth. This sequencing of the read and write blocks result in no block being written into and read from simultaneously. So that proper sequencing may be maintained, information from the write address generator 90 (of FIG. 1) may be supplied to the read address generator 110, as shown in phantom in FIG. 1.

Figure 3:
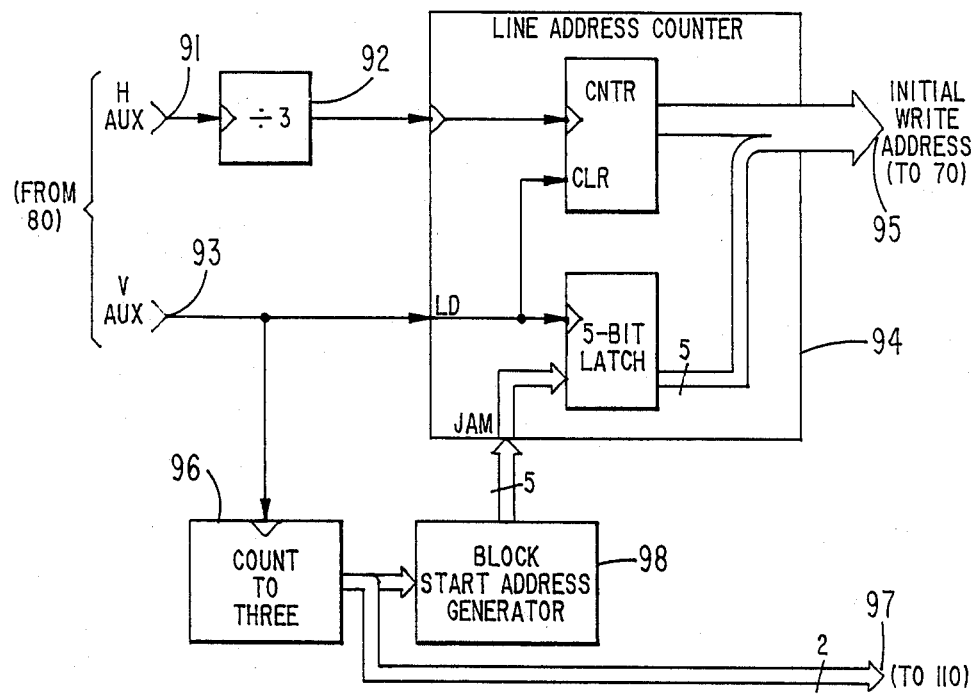
FIG. 3 is a block diagram illustrating an embodiment of a write address generator which may be used in the picture-in-picture video signal generator illustrated in FIG. 1.

FIG. 3 illustrates an embodiment of a write address generator 90 which may be used in the picture-in-picture video signal generator illustrated in FIG. 1. Write address generator 90 supplies an initial write address to self-sequencing memory 70 for each line of compressed auxiliary video signal to be stored. In both FIGS. 3 and 5, thick lines represent multi-bit digital signal paths, and thin lines represent single-bit digital signal paths. The auxiliary synchronization component separator 80 (of FIG. 1) supplies two signals: a horizontal synchronization component H AUX, and a vertical synchronization component V AUX.

In FIG. 3, an input terminal 91 is coupled to auxiliary synchronization component separator 80 (of FIG. 1), and receives the horizontal synchronization component H AUX. Input terminal 91 is coupled to a clock input terminal (indicated by a small triangle) of a divide-by-3 counter 92. An output terminal of divide-by-3 counter 92 is coupled to a clock input terminal of line address counter 94. An output terminal 95 of line address counter 94 is coupled to the write address terminal (W ADR) of self- sequencing memory 70 (of FIG. 1), and carries the initial write address for each line of the compressed auxiliary video signal.

An input terminal 93 is also coupled to auxiliary synchronization component separator 80 (of FIG. 1), and receives the vertical synchronization component V AUX. Input terminal 93 is coupled to an input terminal of a count-to-3 counter 96 and a load input terminal LD of line address counter 94. An output terminal 97 of a count-to-3 counter 96 is coupled to a block start address generator 98 and to read address generator 110 (of FIG. 1). An output of block start address generator 98 is coupled to a jam input terminal of line address counter 94.

The write address generator 90 of FIG. 3 may be configured to allocate samples representing compressed auxiliary video information to memory locations in the following manner. This exemplary memory allocation scheme, which may be used for the HM 53051P memory chip, is described below and illustrated in FIG. 4.

The HM 53051P self-sequencing memory stores groups of 32 samples in each storage location. As described above, each line of compressed auxiliary video information consists of 303 samples. Thus, 10 storage locations are required to store each line of compressed auxiliary video information. Also as described above, three blocks of memory, each capable of storing one field consisting of 87 lines, are allocated to store compressed auxiliary video information.

Figure 4:
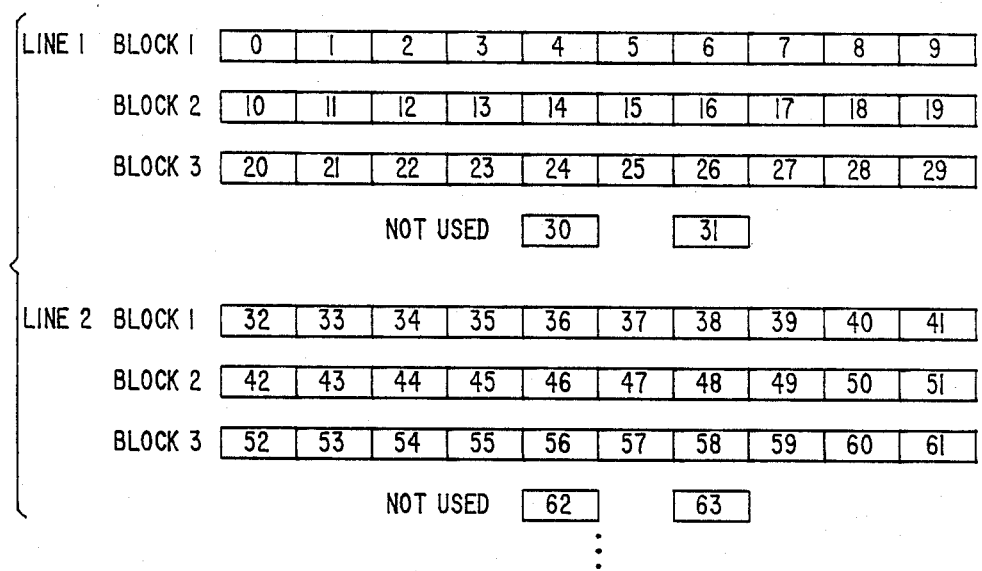
FIG. 4 is a memory allocated diagram illustrating a possible memory allocation scheme for the picture-in-picture image signal generator illustrated in FIG. 1.

In FIG. 4, selected storage locations in self-sequencing memory 70 (of FIG. 1) are illustrated as rectangles. The address which corresponds to that storage location is denoted by its value within the rectangle representing that location. Each row of rectangles represents ten sequential storage locations; enough to contain one line of compressed auxiliary video information. The topmost row, representing storage locations 0 through 9, is allocated to hold samples representing the first horizontal line of a field of compressed auxiliary video information which is to be stored in block 1 (i.e., line 1 of a field n). The second row, representing storage locations 10 through 19, is allocated to hold samples representing line 1 of a field of compressed auxiliary video information which is to be stored in block 2 (i.e., line 1 of a field n+1); and the third row is allocated to hold samples representing line 1 of block 3 (i.e., line 1 of a field n+2).

The fourth row, which represents storage locations 32 through 41, is allocated to hold samples representing the second line of the field of compressed auxiliary video information to be stored in block 1. The fifth row is allocated to hold samples representing line 2 of block 2, and the sixth row is allocated to hold samples representing line 2 of block 3. This pattern continues for all 87 lines. The two memory locations corresponding to addresses 30 and 31 are not allocated to storage of compressed auxiliary video samples. Neither are memory locations corresponding to addresses 62 and 63. Two memory locations remain unallocated for every three lines of compressed auxiliary video signal.

When a field of compressed auxiliary video information is to be written into block 1 of self-sequencing memory 70 (of FIG. 1), write address counter 90 first produces an address signal having the value 0. This is the address corresponding to the location allocated to store the first group of 32 samples in line 1 of block 1 (see FIG. 4). Self-sequencing memory 70 stores the next 303 samples in the sequential locations corresponding to addresses 0 through 9, without requiring further address information. Before the beginning of the second line of that compressed field, write address generator 90 produces an address signal having the value 32, the address corresponding to the location allocated to store the first group of samples in line 2 of block 1. The next 303 samples are stored in locations 32 through 41. The value of the address signal produced before each subsequent line of compressed auxiliary video information is 32 more than that of the previous line.

When lines of compressed auxiliary video information are being written into block 2, write address generator 90 first produces an address signal having the value 10. Samples representing line 1 of this field are stored in sequential locations corresponding to addresses 10 through 19. With every subsequent line, the value of the address signal is incremented by 32. Thus, samples representing the second line of block 2 are stored in 10 sequential locations beginning at the location corresponding to address 42, and so forth.

Similarly, the value of the first address produced by write address generator 90 when a field is to be stored in block 3 is 20. Samples representing line 1 of this field are stored in sequential locations corresponding to addresses 20 through 29. As before, with every subsequent line to be stored, the value of the address signal is incremented by 32. Samples representing line 2 of fields to be stored in block 3 are stored in locations 52 through 61, and so forth.

Referring again to FIG. 3, in operation, count-to-three counter 96 produces a signal which represents the block number into which the current field is to be stored. For example, count-to-three counter 96 may produce a two-bit binary signal repetitively sequencing through the values 1, 2 and 3. Block start address generator 98 produces a starting address corresponding to the initial memory location allocated to the first line in that block as described above. When the output of count-to-three counter 96 is 1, the starting address is 0; when the output of count-to-three counter 96 is 2, the starting address is 10; when the output of count-to-three counter 96 is 3, the starting address is 20.

Block start address generator 98 may be a read only memory (ROM) having an address input terminal coupled to the output terminal of count-to-three counter 96 and a data output terminal coupled to the jam input terminal of line address counter 94, with the associated predetermined start address values preprogrammed into the memory locations corresponding to the addresses 1, 2 and 3. Alternatively, block start address generator 98 may be combinatorial logic circuitry which generates the predetermined start address values from the 2-bit output of count-to-three counter 96.

At the beginning of each auxiliary video signal field, the start address from block start address generator 98 is loaded into line address counter 94 in response to the auxiliary vertical synchronization signal V AUX. The output of line address counter becomes the same as this predetermined value.

Frequency divider 92 produces a clock pulse at the beginning of every third line of the compressed auxiliary video signal. This clock pulse causes line address counter 94 to increment the value of the signal at its output terminal by 32. The write address counter 90 of FIG. 3 may, thus, produce the properly valued address signals to implement the memory allocation scheme described above.

Line address counter 94 may, for example, comprise a binary counter, and a 5-bit latch. The 5-bit latch has an input terminal coupled to the jam input terminal of line address counter 94, and a clock terminal coupled to the load terminal LD of line address counter 94. The output terminal of the 5-bit latch is coupled to the 5 lower-significance bits of the output terminal of line address counter 94. The counter has a clear input terminal (CLR) coupled to the load terminal (LD) of line address counter 94, and a clock input terminal coupled to the clock input terminal of line address counter 94. An output terminal of the binary counter is coupled to the remaining higher significance bits of the output terminal of line address counter 94.

In operation, the 5-bit latch is coupled to receive the output of the block start address generator 98. As described above, for block 1, the start address is 0, or '00000' in 5-bit binary; for block 2, the start address is 10, or '01010' in 5-bit binary; for block 3, it is 20 or '10100'. When an auxiliary vertical synchronization signal occurs, the appropriate 5-bit binary value is latched into the 5-bit latch, and becomes the 5 lesser significance bits of the initial write address. At that same time, the binary counter CNTR is cleared to a count of 0. The resulting initial write address is 0, 10, or 20, as appropriate. As each clock signal occurs at the clock input terminal (CNTR) of the counter its output value increments by one. Because the 5 lesser significant bits are supplied from the 5-bit latch, when the output from the binary counter CNTR increments by one, the value of the initial write address increments by 32. This arrangement can thus produce the required sequence of addresses for the memory allocation scheme illustrated in FIG. 4 in response to the load and clock signals.

Figure 5:
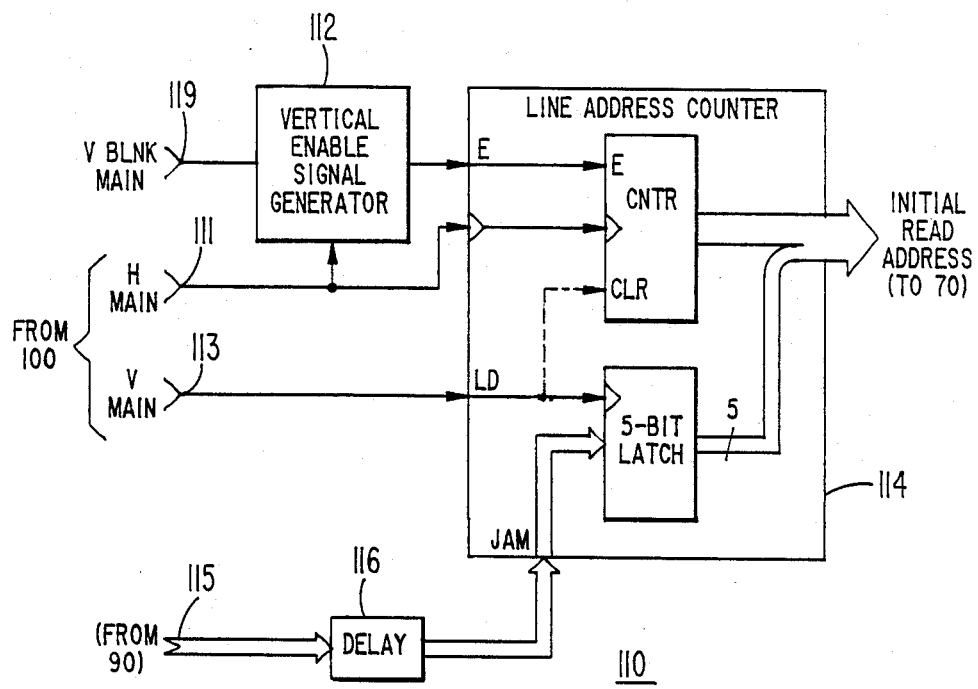
FIG. 5 is a block diagram of a read address generator which may be used in the picture-in-picture video signal generator illustrated in FIG. 1.

FIG. 5 illustrates a read address generator 110 which may be used in the picture-in-picture signal generator illustrated in FIG. 1. In FIG. 5, input terminals 111, 113, and 119 are all coupled to the main synchronization component signal separator 100 (of FIG. 1). Input terminal 111 receives a horizontal synchronization component signal H MAIN, and is coupled to a first input terminal of a vertical enable signal generator 112 and a clock input terminal of line address counter 114. Input terminal 113 receives a vertical synchronization component signal V MAIN, is coupled to a load input terminal LD of line address counter 114. Input terminal 119 receives a vertical blanking signal V BLNK MAIN, and is coupled to a second input terminal of vertical enable signal generator 112. An output terminal of vertical enable signal generator 112 is coupled to an enable E input terminal of a line address counter 114. An output terminal 117 of line address counter 114 is coupled to the read address input terminal (R ADR) of memory 70 (of FIG. 1).

An input terminal 115 is coupled to write address generator 90 (of FIG. 1). Input terminal 115 is coupled to an input terminal of delay 116. An output terminal of delay 116 is coupled to an input terminal of a block start address generator 118. An output terminal of block start address generator 118 is coupled to a jam input terminal of line address counter 114.

In operation, delay 116 receives a signal which corresponds to the sequence of block numbers represented in waveform (a) of FIG. 2, and produces a signal which corresponds to the sequence of block numbers represented in waveform (b) of FIG. 2. The output signal from delay 116 represents the block number of memory from which previously stored compressed auxiliary video information is to be retrieved. Block start address generator 118 generates the predetermined starting address (i.e., 0, 10 or 20) corresponding to the memory block number in a similar manner to that described above for block start address generator 98 of write address generator 90 (of FIG. 3). The main vertical synchronization signal V MAIN, indicating the start of a new field of main video information, conditions line address counter 114 to load the starting address from block start address generator 118 at the beginning of every main vertical scanning interval. This starting address forms the first initial read address.

Vertical enable signal generator 112 generates an enable signal for line address counter 114. The enable signal is produced while the main video signal is scanning lines 182 through 261, into which previously stored auxiliary video signal information is to be inserted. While line address counter 114 is enabled, the main horizontal synchronization component signal H MAIN clock, indicating the start of a new line of main video information, causes the line address counter 114 to increment. Line address counter 114 increments by 32 in a similar manner to the line address counter 94 of the write address generator 90 illustrated in FIG. 3. The output of line address counter 114 is the initial read address for the next line of previously stored compressed auxiliary video information to be inserted into the main video signal. Once this address is supplied to self-sequencing memory 70 (of FIG. 1), subsequent previously stored auxiliary video samples will be retrieved from sequential storage locations of memory 70 without requiring further address information.

Figure 6:
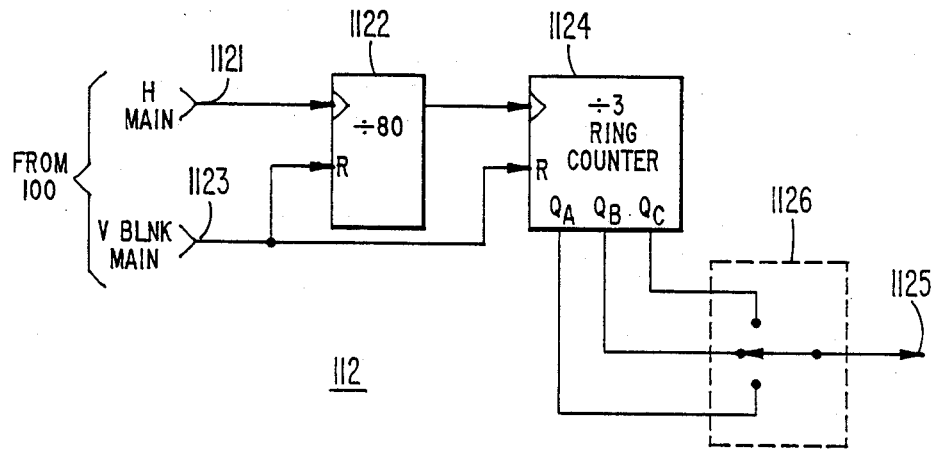
FIG. 6 is a block diagram of a vertical enable signal generator which may be used in the read address generator illustrated in FIG. 4.

FIG. 6 illustrates an embodiment of a vertical enable signal generator 112, which may be used in the read address generator 110 of FIG. 5. Vertical enable signal generator 112 generates a signal indicating that the 80 lines of the main video signal, into which the auxiliary video image is to be inserted, are currently being scanned. This signal is used to enable line address counter 114 of read address generator 110 illustrated in FIG. 5. Until enabled, line address counter 114 produces the address of the storage location containing the first sample of the first line in the memory block from which this data is to be retrieved. When enabled, line address counter is incremented by 32 at each subsequent line of the main video signal. It thus produces the address corresponding to the storage location containing the first sample of the corresponding line of the previously stored compressed auxiliary video information.

In FIG. 6, input terminals 1121 and 1123 are coupled to the main synchronization component separator 100. Input terminal 1121 receives horizontal synchronization signal H MAIN. Input terminal 1123 receives vertical blanking signal V BLNK MAIN. Input terminal 1121 is coupled to a clock input terminal of divide-by-80 counter 1122. An output terminal of divide-by-80 counter 1122 is coupled to a clock input terminal of a divide-by-3 ring counter 1124. Ring counter 1124 includes three output terminals $Q_A$, $Q_B$ and $Q_C$. These output terminals are coupled to respective input terminals of a selector switch 1126. An output terminal of selector switch 1126 is coupled to an output terminal 1125. Output terminal 1125 is coupled to the enable input terminal (E) of line address counter 114 (of FIG. 5). Input terminal 1123 is coupled to respective reset terminals (R) of divide-by-80 counter 1122 and ring counter 1124.

In operation, the main vertical blanking signal V BLNK MAIN, is present during the first 21 lines of each field of the main video signal and indicates that the vertical blanking interval (VBI as described above) of the main video signal is being scanned. This signal conditions the divide by 80 counter 1122 to produce logic signals at outputs ($Q_A$, $Q_B$, $Q_C$) of (1,0,0) respectively. The main horizontal synchronization component H MAIN causes divide by 80 counter to increment at the beginning of every main video signal horizontal line.

During the first 80 lines after the VBI (i.e., lines 22 through 101), the outputs ($Q_A$, $Q_B$, $Q_C$) of ring counter 1124 produce logic signals (1,0,0) respectively. After 80 lines of the main video signal have been counted by divide-by-80 counter 1122, a clock pulse is provided to ring counter 1124. The logic signals at output terminals ($Q_A$, $Q_B$, $Q_C$) are then (0,1,0), respectively. These logic signals remain during the next 80 lines (i.e., lines 102 through 181). After another 80 lines is counted by divide by 80 counter 1122, another clock pulse is supplied to ring counter 1124. Ring counter 1124 output terminals ($Q_A$, $Q_B$, $Q_C$) then produce logic signals (0,0,1). These logic signals remain during the next 80 lines (i.e., lines 182 through 261). $Q_A$ is thus a logic '1' signal during a top third of the picture-in-picture image, and a logic '0' signal otherwise; output terminal $Q_B$ is a logic '1' signal during a middle third and output terminal $Q_C$ is a logic '1' signal during a lower third of the picture-in-picture image and are logic '0' signals otherwise. Selector switch 1126, supplies one of the output signals from ring counter 1124 to output terminal 1125. The vertical location of the auxiliary video image in the picture-in-picture video image is selected by enabling line address counter 114 of the read address counter 110 (of FIG. 4) during either the top, middle or bottom third of the picture-in-picture image.

In the following claims, the term self-sequencing memory is a memory which stores samples in sequential storage locations beginning at a location corresponding to the last received write address and retrieves samples from sequential storage locations beginning at a location corresponding to the last received read address.

What is claimed is:

1. A picture-in-picture video signal generator, comprising:

a source of an auxiliary video signal;

means for producing successive samples representing said auxiliary video signal;

a self-sequencing memory, having a data input terminal coupled to said means for producing samples having data output and address input terminals;

write control circuitry coupled between said source of said auxiliary video signal and said address input terminal of said self-sequencing memory for producing sequences of initial write address signals, said write address signals occurring in synchronism with and at the rate of horizontal line intervals of said auxiliary video signal;

a source of a main video signal;

read control circuitry coupled between said main video signal source and said address input terminal of said self-sequencing memory, for producing sequences of initial read address signals, said read address signals occurring in synchronism with and at the rate of horizontal line intervals of said main video signal; and means coupled to said data output terminal of said self-sequencing memory and said main video signal source for generating a picture-in-picture video signal.

2. A picture-in-picture video signal generator, comprising:

a source of an auxiliary video signal;

means for producing successive samples representing said auxiliary video signal;

a self-sequencing memory, having a data input terminal coupled to said means for producing samples and having data output and address input terminals;

write control circuitry coupled between said source of said auxiliary video signal and said address input terminal of said self-sequencing memory, for producing initial write address signals, in synchronism with horizontal line intervals of said auxiliary video signal, said write control circuitry including;
a synchronization component separator, coupled to said auxiliary video signal source, for producing an auxiliary horizontal synchronization signal, and an auxiliary vertical synchronization signal;
a frequency divider responsive to said auxiliary horizontal synchronization signal, and having an output terminal;
a line address counter having a clock input terminal coupled to said output terminal of said frequency divider and an output terminal for producing at least a component of said initial write address signals;
means, responsive to said auxiliary vertical synchronization signal, for setting said line address counter to a predetermined count at the beginning of a vertical scan of said auxiliary video signal;
a source of a main video signal;
read control circuitry coupled between said main video signal source and said address input terminal of said self-sequencing memory, for producing successive initial read address signals, in synchronism with horizontal line intervals of said main video signal; and
means coupled to said data output terminal of said self-sequencing memory and said main video signal source for generating a picture-in-picture video signal.

3. The picture-in-picture video signal generator of claim 2, wherein said line address counter comprises:
a latch for producing lower significance bits of said initial write address; and
a binary counter for producing higher significance bits of said initial write address.

4. The picture-in-picture video signal generator of claim 2 wherein:
memory locations of said self-sequencing memory are allocated as a plurality of blocks, each of which can store one field of auxiliary video signal information; and
said line address counter setting means comprises a field counter responsive to said auxiliary vertical synchronization signal for producing a signal representing the block of said self-sequencing memory into which samples representing a current field of said auxiliary video signal is to be written; a block start address generator, coupled to said field counter, for producing a signal representing the initial write address of the first line of said block of said self-sequencing memory; and means for setting said line address counter to said initial write address of said first line at the beginning of said current field of said auxiliary video signal.

5. A picture-in-picture video signal generator, comprising:
a source of an auxiliary video signal;
means for producing successive samples representing said auxiliary video signal;
a self-sequencing memory, having a data input terminal coupled to said means for producing samples, and having data output, and address input terminals;
write control circuitry coupled between said source of said auxiliary video signal and said address input terminal, for producing successive initial write address signals, in synchronism with horizontal line intervals of said auxiliary video signal;
a source of a main video signal;
read control circuitry coupled between said main video signal source and said address input terminal, for producing successive initial read address signals, in synchronism with horizontal line intervals of said main video signal, said read control circuitry including:
a synchronization component separator coupled to said main video signal source, for producing main horizontal synchronization signal and a main vertical synchronization signal;
a line address counter, responsive to said main horizontal synchronization signal, and having an enable input terminal, for producing a signal representing said initial read address signals in response to an enable signal at said enable input terminal;
a vertical enable signal generator, responsive to said main horizontal and vertical synchronization signals, and having an output terminal coupled to said enable terminal of said line address counter, for generating said enable signal when currently scanned lines of said main video signal are to have auxiliary image information inserted into them;
means responsive to said main vertical synchronization signal, for setting said line address counter to a predetermined value at the beginning of a vertical scan of said main video signal; and
means coupled to said data output terminal of said self-sequencing memory and said main video signal source for generating a picture-in-picture video signal.

6. The picture-in-picture video signal generator of claim 5, wherein said line address counter comprises:
a latch for producing lower significance bits of said initial read address; and
a binary counter for producing higher significance bits of said initial read address.

7. The picture-in-picture video signal generator of claim 6, wherein said vertical enable signal generator comprises:
first means responsive to said main horizontal synchronization signal for counting to a predetermined number representing the starting line in said picture-in-picture video signal for inserting auxiliary video signal;
second means responsive to said main horizontal synchronization signal for counting to a predetermined number representing the number of lines of main video signal into which said auxiliary video signal is inserted into said picture-in-picture video signal; and
means coupled to said first and second means for producing said enable signal.

8. The picture-in-picture video signal generator of claim 7, wherein said first and second means in combination comprise a frequency divider.

9. The picture-in-picture video signal generator of claim 8, wherein said enable signal producing means comprises a ring counter responsive to said frequency divider.

10. The picture-in-picture video signal generator of claim 5, wherein:
memory locations of said self-sequencing memory are allocated as a plurality of blocks, each of which has capacity to store one filed of auxiliary video signal; and said line address counter setting means comprises means for producing a signal representing the block of said self-sequencing memory from the which samples representing a previously stored filed of said auxiliary video signal are to be retrieved; a block start address generator, coupled to said block representative signal producing means, for producing a signal representing the initial read address of the first line of said block of said self-sequencing memory; and means for setting said line address counter to said initial read address of said first line at the beginning of the time period of insertion of said auxiliary video signal into said picture-in-picture video signal.

11. The picture-in-picture video signal generator of claim 10, wherein said block representative signal producing means comprises a delay circuit.

12. The picture-in-picture video signal generator of claim 5, wherein said write control circuitry comprises: a further synchronization component separator, coupled to said auxiliary video signal source, for producing an auxiliary horizontal synchronization signal.

13. The picture-in-picture video signal generator of claim 12, wherein:

said further synchronization component separator also produces and auxiliary vertical synchronization signal; and said write control circuitry further includes a write address generator comprising:

a further frequency divider responsive to said auxiliary horizontal synchronization signal, and having an output terminal;

a further line address counter having a clock input terminal coupled to said output terminal of said further frequency divider and an output terminal for producing at least a component of said initial write address signals; and means, responsive to said auxiliary vertical synchronization signal, for setting said line address counter to a predetermined count at the beginning of a vertical scan of said auxiliary video signal.

14. The picture-in-picture video signal generator of claim 13, wherein said line address counter comprises:

a latch for producing lower significance bits of said initial write address signal; and a binary counter for producing higher significance bits of said initial write address.

15. The picture-in-picture video signal generator of claim 13, wherein:

memory locations of said self-sequencing memory are allocated as a plurality of blocks, each having capacity to store one field of auxiliary video signal; and said line address counter setting means comprises a field counter responsive to said auxiliary vertical synchronization signal for producing a signal representing the block of said self-sequencing memory into which samples representing a current field of said auxiliary video signal are to be written; a block start address generator, coupled to said field counter, for producing a signal representing the initial write address of the first line of said block of said self-sequencing memory; and means for setting said line address counter to said initial write address of said first line at the beginning of said current field of said auxiliary video signal.

* * * * *